United States Patent [19]

Tripp

[11] Patent Number: 5,054,541
[45] Date of Patent: Oct. 8, 1991

[54] GROUND COIL ASSEMBLY

[75] Inventor: Benjamin A. Tripp, Orangeville, Canada

[73] Assignee: Robert Rumball, North York, Canada

[21] Appl. No.: 609,737

[22] Filed: Nov. 6, 1990

[51] Int. Cl.$^5$ ............................................. F28D 21/00
[52] U.S. Cl. ..................................... 165/45; 126/442; 405/130
[58] Field of Search ................... 165/45; 126/442, 433, 126/400; 62/260; 405/130

[56] References Cited

U.S. PATENT DOCUMENTS

| | | | |
|---|---|---|---|
| 942,337 | 12/1909 | Moore | 165/45 |
| 4,219,074 | 8/1980 | Hansen | 165/45 |
| 4,544,028 | 10/1985 | Chase | 126/400 |
| 4,570,452 | 2/1986 | Bingham | 165/45 |

FOREIGN PATENT DOCUMENTS

| | | | |
|---|---|---|---|
| 3022624 | 12/1981 | Fed. Rep. of Germany | 165/45 |
| 3232268 | 10/1983 | Fed. Rep. of Germany | 165/45 |

Primary Examiner—John Rivell
Assistant Examiner—L. R. Leo
Attorney, Agent, or Firm—Ridout & Maybee

[57] ABSTRACT

A prefabricated ground coil assembly for use in association with a ground source heat pump comprises a flexible pipe configured as a double spiral. The outermost turns of the spiral are provided with an inlet connection and an outlet connection for heat exchange fluid, respectively. The turns of the spiral are interconnected by flexible constraining means so that the assembly is extendible axially from a nested annular configuration to an elongate coniform configuration in which the turns of the double spiral are supported in predetermined space relation by the flexible constraining means. The assembly is easy to install, and can be installed in a relatively shallow pit which occupies only a small ground area.

4 Claims, 3 Drawing Sheets

GROUND COIL ASSEMBLY

FIELD OF THE INVENTION

The present invention relates to a ground coil assembly for use in association with the ground source heat pump of a heating/cooling system.

BACKGROUND OF THE INVENTION

Heat exchangers intended to be buried in the ground for use with ground source heat pumps are well known, particularly for buildings, and are of two kinds, horizontal and vertical.

The horizontal type involves the placement of one or more pipes horizontally in a relatively shallow trench, the pipes being buried from three to six feet deep or more, and spaced apart either horizontally or vertically, or both. The disadvantage of this arrangement is that the trench must be rather long in practice, ranging from 50 feet per ton rating of the heat pump to 500 feet per ton rating depending on the specific design involved. The systems requiring shorter trenches have greater market potential than systems having longer trenches, but all these horizontal systems are restricted by the requirement for an appropriate pipe installation space and they are virtually restricted to rural properties or relatively large urban lots.

The vertical type of ground coil has two basic variations. The first and most common must be installed in a borehole of relatively small diameter which may extend into the ground for more than 100 feet. Ground coils which may be installed to a smaller depth are rare, and are undesirable because of the increased complexity of the headers required. The main disadvantage of the vertical installation is that it permits the introduction of contaminants along the borehole into the aquifer. This is a significant disadvantage because the boreholes are not sealed, only filled. For this reason, this type of system has already been prohibited by legislation in some jurisdictions. The second type of vertical ground coil requires medium sized boreholes of from twelve to forty-eight inches in diameter, but still may require to be installed to a depth of fifty feet even for a relatively small system. The equipment used to make such boreholes is prone to damage by boulders or other obstructions.

It is an object of the present invention to provide a ground coil assembly for use in association with a ground source heat pump, which does not have to be installed to a great depth and which takes up only a small ground area.

Another object of the invention is to provide such a ground coil assembly which can be easily packed and shipped in a small size and which is particularly easy to instal.

SUMMARY OF THE INVENTION

In accordance with the invention, a ground coil assembly for use in association with a ground source heat pump comprises a flexible pipe configured as a double spiral defined by first and second sets of pipe turns, the outermost turns providing, respectively, an inlet connection and an outlet connection for heat exchange fluid, and flexible constraining means interconnecting adjacent turns of said first and second sets. The assembly is readily extendible axially from a nested annular configuration to an elongate coniform configuration in which the turns of said sets are supported in predetermined spaced relation by the flexible constraining means.

The assembly can be prefabricated in a factory and can be tied in its nested annular configuration for easy storage, shipping and handling.

BRIEF DESCRIPTION OF THE DRAWINGS

One embodiment of the invention will now be described, by way of example, with reference to the accompanying drawings in which.

DESCRIPTION OF THE PREFERRED EMBODIMENT

Figure 1:
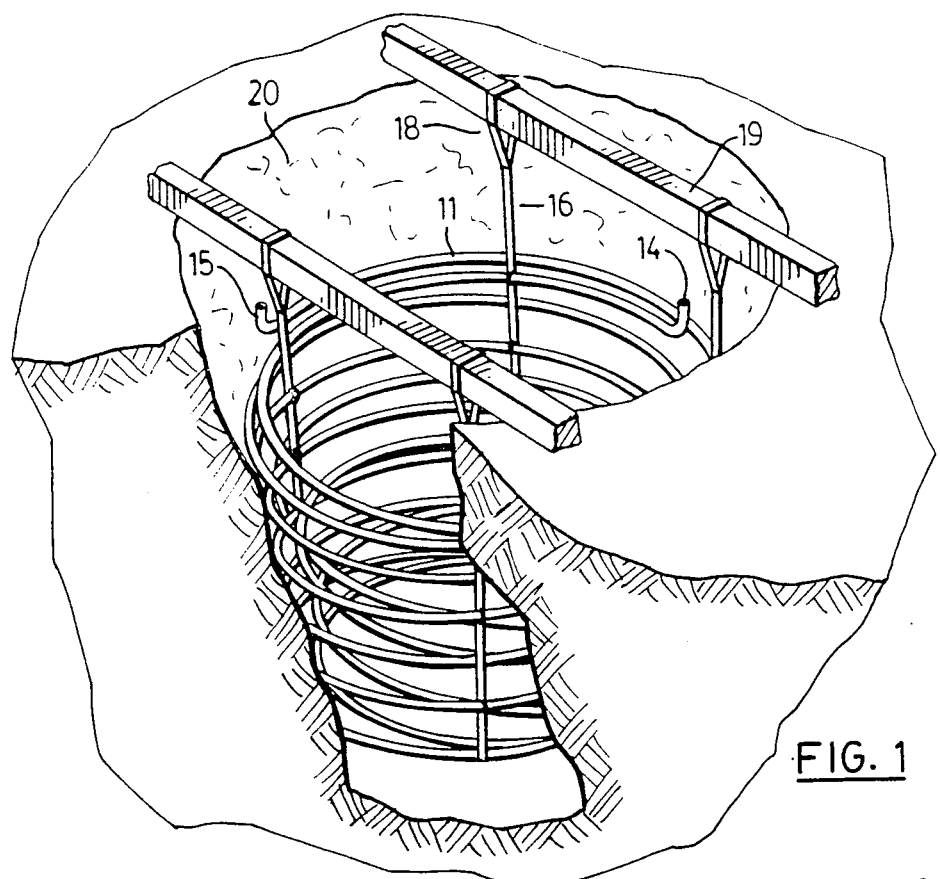
FIG. 1 is a perspective view, partly broken away, showing the ground coil being installed in a pit.
Figure 2:
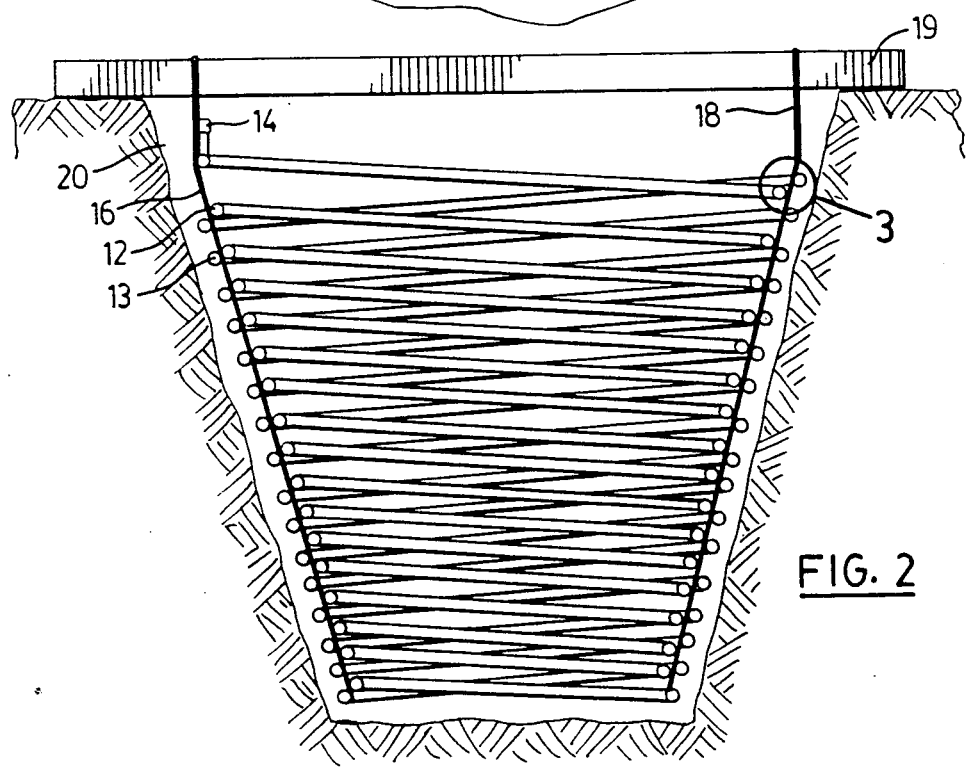
FIG. 2 is a vertical sectional view of FIG. 1.

Referring to FIGS. 1 and 2, the ground coil assembly basically comprises a flexible pipe 11 configured as a double spiral defined by a first set of pipe turns 12 and a second set of pipe turns 13. The outermost turns of the two sets are terminated, respectively, by an inlet connection 14 and an outlet connection 15 for heat exchange fluid. The pipe turns are supported and constrained by a plurality of circumferentially spaced, flexible straps 16 to which the pipe turns of the first and second sets 12, 13 are attached at spaced intervals along the straps. As illustrated, the pipe turns 12 of the first set and the pipe turns 13 of the second set are attached to the straps 16 on opposite sides thereof so that the first and second sets form an inner layer and an outer layer of the double spiral configuration.

Figure 3:
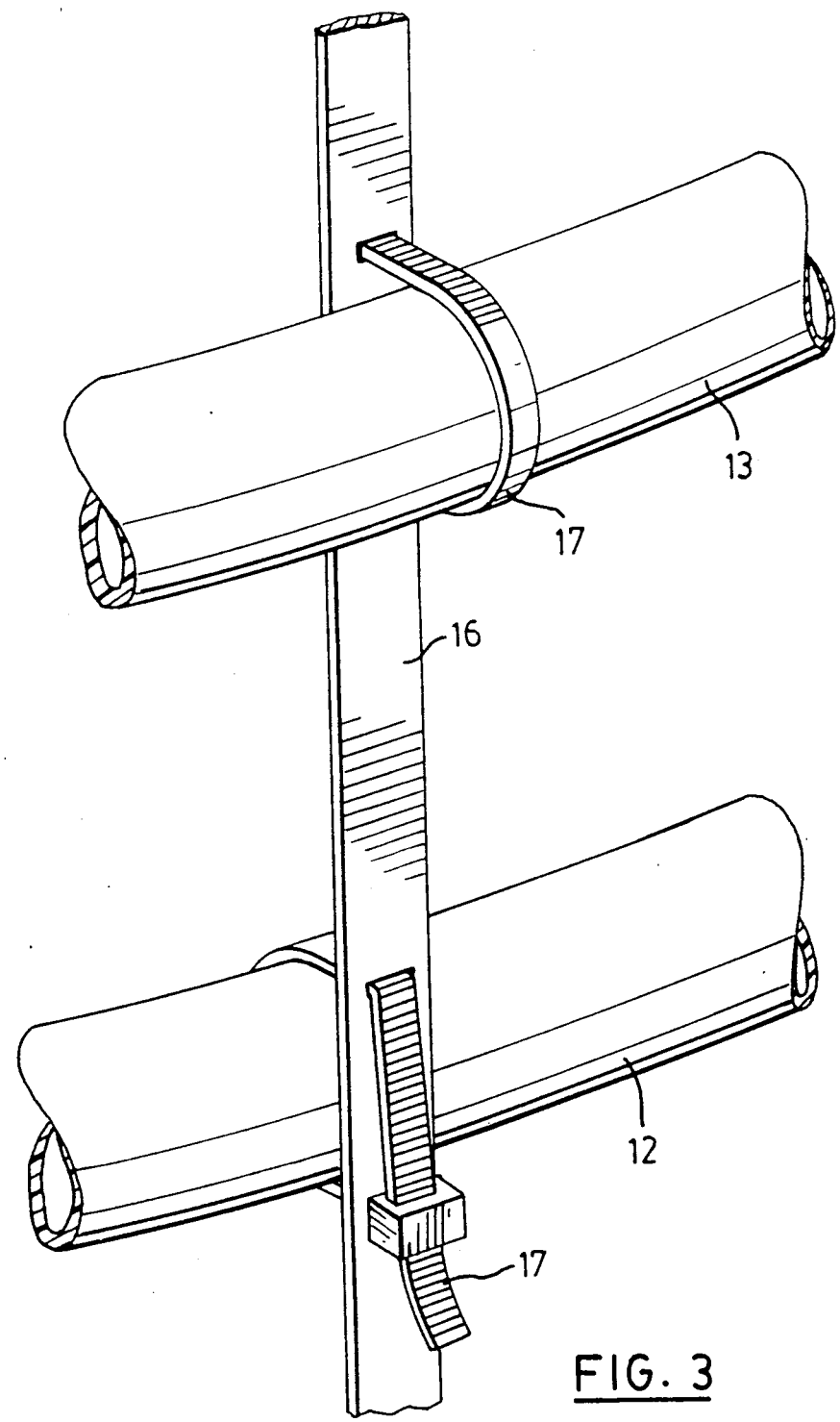
FIG. 3 is an enlarged perspective view showing a detail of the ground coil assembly.

The pipe turns are attached to the straps 16 by fastening belts 17, as shown in FIG. 3. The fastenings 17 may be of any convenient type, but in the preferred embodiment shown they are one way fastenings of the ratchet type. The upper ends of the straps 16 are terminated by loops 18 for suspending the assembly from an above-ground support means. The support means comprise a pair of beams 19 which extend across the top of the pit 20 in which the assembly is installed, the beams passing through the loops 18.

The pit 20 is of frusto conical shape to accommodate the ground coil which, in its extended operative condition, is also of coniform configuration.

Figure 4:
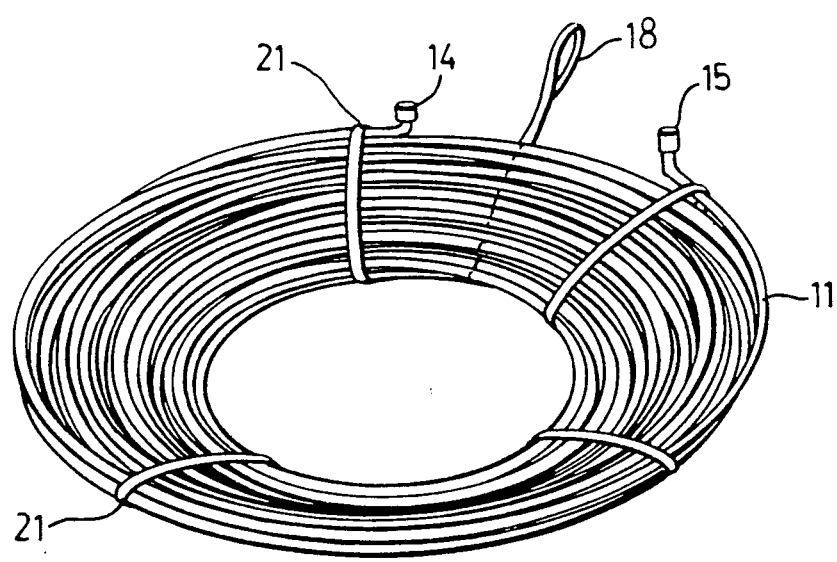
FIG. 4 is a perspective view showing the assembly collapsed in its nested annular configuration.

The pipe is essentially flexible, and may be of plastic or copper. Prior to its installation, the prefabricated assembly is stored and delivered as a compact package, which is shown in FIG. 4. In this package, the turns of the spiral are collapsed axially so that they are nested in a generally annular configuration, and are retained in that configuration by ties 21.

To instal the ground coil, one must first excavate the pit 20 of the required coniform shape and size. This may be done by means of a rubber-tired backhoe, this type of machine being readily available on short notice in most communities, and easily rented for the very brief periods of time required for the installation. The beams 19 are passed through the loops 18 of the support means, and are placed over the pit. The ties 21 are then removed so that the double spiral ground coil will extend under its own weight, the axial length of the assembly being then determined by the constraining straps 16. The inlet and outlet connections 14, 15 may then be connected to the heat pump system, after which the pit 20 is filled with loose, stone-free fill. Finally, the beams 19 can be removed, leaving the ground coil properly installed in the ground.

I claim:

1. A prefabricated ground coil assembly for use in association with a ground source heat pump, comprising:
- a flexible pipe configured as a double spiral defined by first and second sets of pipe turns, the outermost turns of said first and second sets providing, respectively, an inlet connection and an outlet connection for heat exchange fluid, and
- flexible constraining means interconnecting adjacent turns of said first and second sets,
- the assembly being extendible axially from a nested annular configuration to an elongate coniform configuration in which the turns of said sets are supported in predetermined spaced relation by said flexible constraining means.

2. A prefrabricated assembly as claimed in claim 1, wherein the flexible constraining means comprise a plurality of circumferentially spaced flexible straps to which the pipe turns of said first and second sets are attached at spaced intervals therealong.

3. A prefabricated assembly as claimed in claim 2, wherein the pipe turns of said first set and the pipe turns of said second set are attached to the straps on opposite sides thereof.

4. A prefrabricated assembly as claimed in claim 1, wherein the ends of the straps provide suspension means for suspending the assembly from an above-ground support during installation of the assembly.

* * * * *